United States Patent
Chou

(10) Patent No.: US 7,985,030 B1
(45) Date of Patent: Jul. 26, 2011

(54) SURVEILLANCE APPARATUS

(75) Inventor: Chia-Hung Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/782,722

(22) Filed: May 19, 2010

(30) Foreign Application Priority Data

Mar. 2, 2010 (CN) .......................... 201010116059.9

(51) Int. Cl.
*G03B 17/00* (2006.01)
(52) U.S. Cl. ..................... 396/428; 248/187.1
(58) Field of Classification Search .................. 396/427, 396/428; 348/375, 373, 374; 248/187.1
See application file for complete search history.

(56) References Cited

U.S. PATENT DOCUMENTS

| 6,708,943 B2 * | 3/2004 | Ursan et al. | 248/660 |
|---|---|---|---|
| 7,170,560 B2 * | 1/2007 | Tatewaki et al. | 348/375 |
| 7,435,019 B2 * | 10/2008 | Lee | 396/427 |
| 7,586,537 B2 * | 9/2009 | Konishi et al. | 348/373 |
| 7,663,692 B2 * | 2/2010 | Chang | 348/372 |
| 2003/0103161 A1 * | 6/2003 | Tatewaki et al. | 348/375 |
| 2009/0052884 A1 * | 2/2009 | Lee | 396/427 |
| 2010/0034530 A1 * | 2/2010 | Son | 396/427 |
| 2010/0259613 A1 * | 10/2010 | Lee | 348/143 |

* cited by examiner

*Primary Examiner* — Clayton E Laballe
*Assistant Examiner* — Warren K Fenwick
(74) *Attorney, Agent, or Firm* — Zhigang Ma

(57) ABSTRACT

A surveillance apparatus, comprising: a holder; a first adjusting member disposed on the holder, the first adjusting member comprising a first annular plate and two extending portions each defining a second through hole; a second adjusting member comprising a second annular plate and a third annular plate; an image pick-up device sleeved on the third annular plate; a third adjusting member comprising a fourth annular plate, a pair of handles, and two fasteners, the handles each defining a fifth through hole corresponding to the second through holes, the fourth annular plate rotatably sleeves on the third annular plate; the first adjusting member and the third adjusting member is assembled together.

13 Claims, 3 Drawing Sheets

SURVEILLANCE APPARATUS

BACKGROUND

1. Technical Field

The present disclosure relates to surveillance apparatuses and, particularly, to a surveillance apparatus having manually adjustable fixed view image pick-up device.

2. Description of Related Art

Generally, fixed view security cameras are mounted to a permanent fixture and manually adjusted for a desired viewing angle during install. Presently, adjustments to aim an image pick-up device involve rotating the pick-up device about two axes, which does not allow for the most accurate adjustments. Further, the adjustable mechanisms involved are complicated and not easily manipulated, which is inconvenient for users.

What is needed therefore, is a surveillance apparatus which can ameliorate the above-described limitations.

BRIEF DESCRIPTION OF THE DRAWINGS

Many aspects of the present surveillance apparatus should be better understood with reference to the following drawings. The components in the drawings are not necessarily drawn to scale, the emphasis instead being placed upon clearly illustrating the principles of the present surveillance apparatus. Moreover, in the drawings, like reference numerals designate corresponding parts throughout the several views.

DETAILED DESCRIPTION

Figure 1:
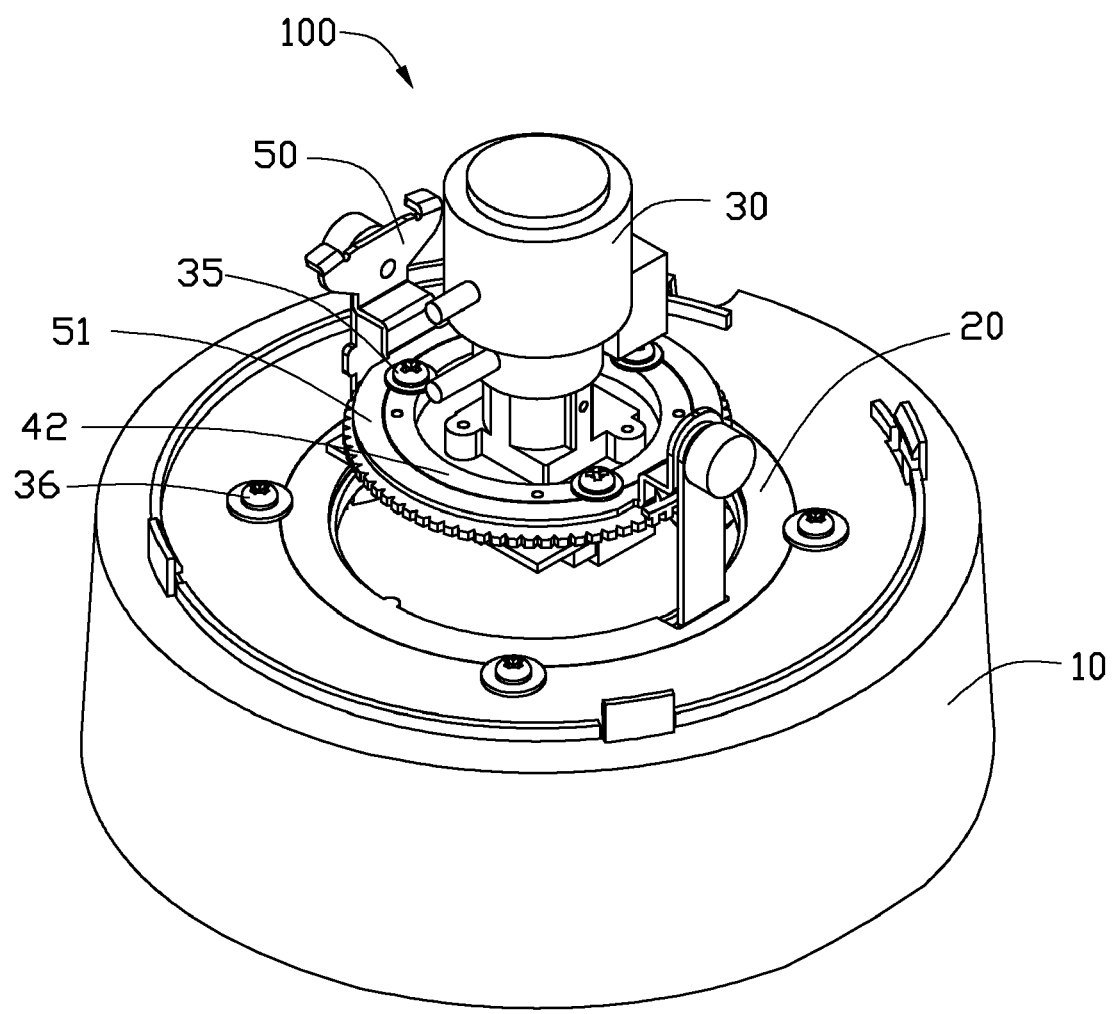
FIG. 1 is an assembled, isometric view of a surveillance apparatus, according to an embodiment.
Figure 2:
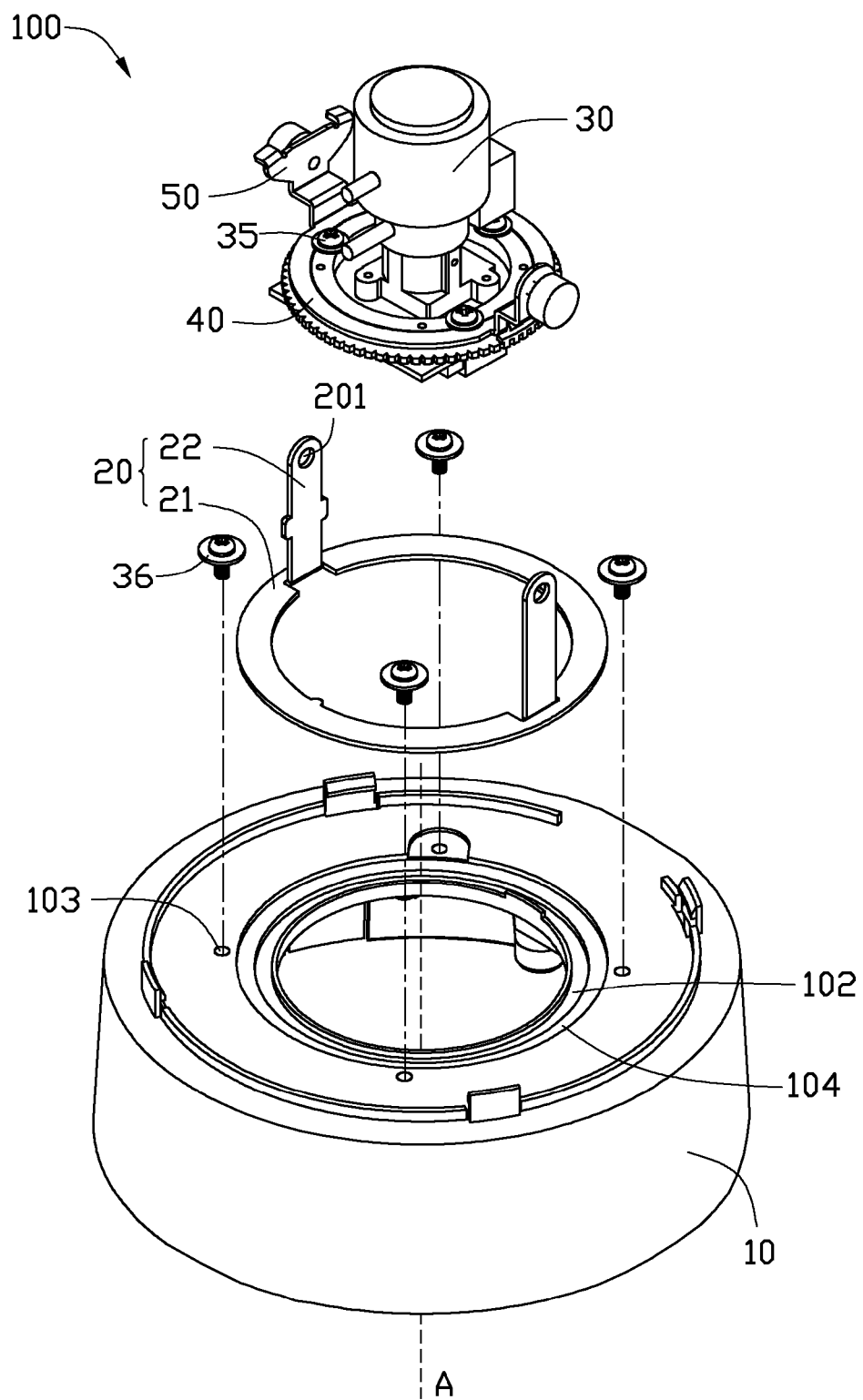
FIG. 2 is an exploded, isometric view of the surveillance apparatus of FIG. 1.

Referring to FIG. 1 and FIG. 2, a surveillance apparatus 100, according to an embodiment, includes a holder 10, a first adjusting member 20, an image pick-up device 30, a second adjusting member 40, and a third adjusting member 50, and a plurality of screws 35 and 36. The first adjusting member 20 is rotatably mounted to the holder 10. The second adjusting member 40 is rotatably mounted to the third adjusting member 50. The third adjusting member 50 is engaged with the first adjusting member 20.

The holder 10 has a generally hollow cylinder configuration and defines a circular opening 102 and a first through holes 103 equidistantly distributed around the opening 102. The opening 102 includes a circular stepped groove 104 which has a lower groove (not labeled) and an upper groove (not labeled) formed above the lower groove.

The first adjusting member 20 includes a first annular plate 21 and two extending portions 22 diametrically extending upward from the first annular plate 21. The two extending portions 22 are substantially parallel to each other. Each extending portion 22 defines a second through hole 201 therein adjacent to a distal end. The two second through holes 201 are aligned with each other. The outer diameter of the first annular plate 21 is substantially equal to the inner diameter of the upper groove of the stepped groove 104, and the first annular plate 21 is rotatably seated in the upper groove.

Figure 3:
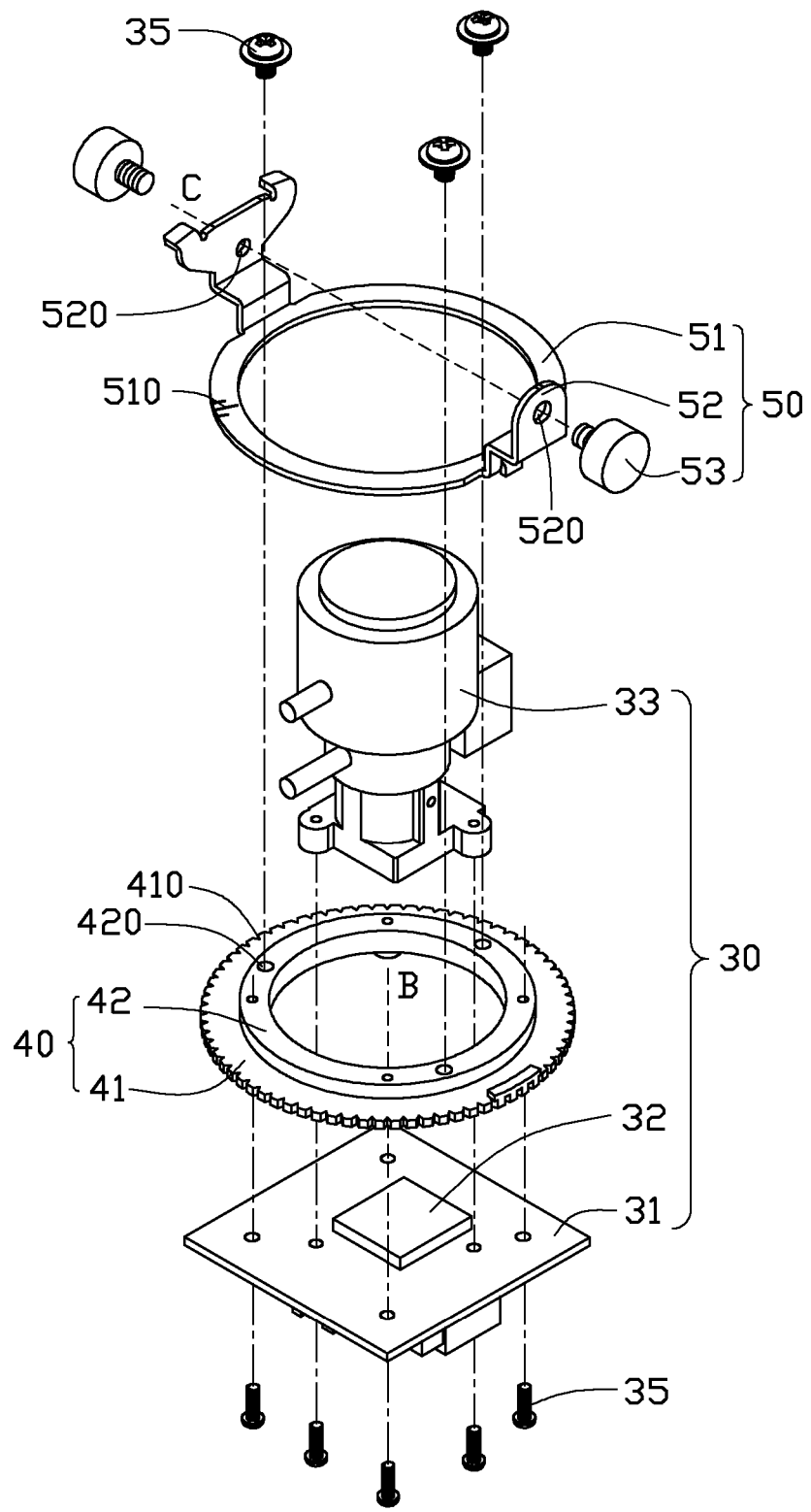
FIG. 3 is an exploded, isometric view of a second adjusting member, an image pick-up device, and a third adjusting member of the surveillance apparatus of FIG. 2.

Referring to FIG. 3, the image pick-up device 30 includes a base plate 31, an image sensor 32, and a lens module 33. The image sensor 32 is electrically disposed on the base plate 31 and optically coupled with the lens module 33. The base plate with a sixth through holes (not labeled).

The second adjusting member 40 includes a second annular plate 41 and a third annular plate 42. The third annular plate 42 coaxially extends upward from the second annular plate 41. The second adjusting member 40 defines four third through holes 420 running through the second and third annular plates 41 and 42. The outer periphery of the second annular plate 41 is toothed with an equivalent scale. The image pick-up device 30 is received in the third annular plate 42. The second adjusting member 40 is mounted to the base plate 31 by screwing four screws 35 from the bottom side of the base plate 31 through the third through holes 420 and into the base plate 31. The lens module 33 defines a fourth through holes (not labeled) at a bottom portion and is fixed to the base plate 31 by running the screws 35 through the fourth through holes of the lens module 33 and the sixth through holes of the base plate 31 from the bottom side of the base plate 31.

The third adjusting member 50 includes a fourth annular plate 51, a pair of handles 52, and two fasteners 53. The inner diameter of the fourth annular plate 51 is substantially equal to the outer diameter of the third annular plate 42. The thickness of the fourth annular plate 51 along an axis direction thereof is substantially equal to that of the third annular plate 42. The fourth annular plate 51 sleeves on the third annular plate 42. The handles 52 diametrically extend upward from opposite sides of the fourth annular plate 51, and each defines a fifth through hole 520 corresponding to the second through hole 201. The fourth annular plate 51 has a position indicator 510. The relative position between the lens module 33 and the third adjusting member 50 can be exactly indicated by the position indicator 510 according to which of teeth 410 formed on the outer periphery of the second annular plate 41 the position indicator 510 is aligned with during rotating the lens module 33 relative to the third adjusting member 50.

When assembling the surveillance apparatus 100, the image sensor 32 is electrically connected to and mounted on the base plate 31, and the lens module 33 is fixed to the base plate 31 and aligned with the image sensor 32. The third annular plate 42 of the second adjusting member 40 is fixed to the base plate 31 by the screws 35 from the bottom side of the base plate 31, and the fourth annular plate 51 rotatably sleeves on the third annular plate 42 and seats on the second annular plate 41 with the screws 35 pressing on the forth annular plate 51. The fifth through holes 520 of the third adjusting member 50 are aligned with the second though holes 201 of the extending portions 22. Then the third adjusting member 50 and the first adjusting member 20 are assembled together by the fasteners 53. As such, the third adjusting member 50 is pivotably attached to the first adjusting member 20 by screws 53. The first adjusting member 20 seats in the stepped groove 104, and is secured on the holder 10 by the screws 36 extending through the first through holes 103 and pressing on the first annular plate 21. It can be understood that the image pick-up device 30 can be rotated about the axis C (Referring to FIG. 3) of the fifth through holes 520 during assembly to a desired position.

After the surveillance apparatus 100 is assembled, to make further adjustments, the screws 36 can be loosened, and the image pick-up device 30 rotated about the axis A of the holder 10 to a desired position. To adjust the image pick-up device 30 by rotating it about the axis B the screws 35 pressing on the fourth annular plate can be loosened.

It is to be understood, however, that even though numerous characteristics and advantages of the disclosure have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A surveillance apparatus, comprising:
   a holder;
   a first adjusting member rotatably disposed on the holder, the first adjusting member comprising a first annular plate and two extending portions diametrically extending upward from the first annular plate, the extending portions are substantially parallel to each other and each defining a second through hole;
   a second adjusting member comprising a second annular plate and a third annular plate coaxially extending upward from the second annular plate;
   an image pick-up device received in the third annular plate;
   a third adjusting member comprising a fourth annular plate, a pair of handles oppositely formed upwardly from the fourth annular plate, and two fasteners, the handles each defining a fifth through hole corresponding to the two fasteners and the second through holes, the fourth annular plate rotatably sleeves on the third annular plate;
   wherein the first adjusting member and the third adjusting member are assembled together by mounting the two fasteners to the second through holes and the fifth through holes.

2. The surveillance apparatus of claim 1, wherein the holder defines an opening, a stepped groove is defined around the opening, the groove including a lower groove and a upper groove, the outer diameter of the first annular plate is substantially equal to the inner diameter of the upper groove, and the first annular plate seats in the upper groove.

3. The surveillance apparatus of claim 2, further comprising a plurality of screws, wherein the holder defines a first through holes, the first adjusting member is secured on the holder by mounting screws to the first through holes corresponding to the screws.

4. The surveillance apparatus of claim 3, wherein the image pick-up device comprises a base plate with a sixth through holes corresponding to the screws, an image sensor mounted on the base plate, and a lens module aligned with the image sensor and mounted on the base plate.

5. The surveillance apparatus of claim 4, wherein lens module defines a fourth through holes at a bottom portion and is fixed to the base plate by running the screws through the fourth through holes of the lens module and the sixth through holes of the base plate from the bottom side of the base plate.

6. The surveillance apparatus of claim 4, wherein the second adjusting member defining a third through holes corresponding to the sixth through hole of the base plate, the second adjusting member mounted to the base plate by running the screws through the third through holes of the second adjusting member and the sixth through holes of the base plate.

7. The surveillance apparatus of claim 1, wherein the inner diameter of the fourth annular plate is substantially equal to the outer diameter of the third annular plate.

8. The surveillance apparatus of claim 1, wherein the outer periphery of the second annular plate is toothed, with an equivalent scale, the fourth annular plate has a position indicator to indicate a position relative to the teeth.

9. The surveillance apparatus of claim 1, wherein the thickness of the fourth annular plate along an axis direction thereof is substantially equal to that of the third annular plate.

10. A surveillance apparatus, comprising:
    a holder;
    a first adjusting member rotatably disposed on the holder and comprising a first annular plate and two extending portions diametrically extending upward from the first annular plate;
    a second adjusting member comprising a second annular plate and a third annular plate coaxially extending upward from the second annular plate;
    an image pick-up device received in the third annular plate;
    a third adjusting member comprising a fourth annular plate sleeved on the third annular plate, and a pair of opposite handles formed upwardly from the fourth annular plate;
    wherein the third adjusting member is pivotably attached to the first adjusting member, the image pick-up device can rotate not only about the axis of the holder, but also rotate about the axis of the third though holes and the axis of the third annular plate of the second adjusting member.

11. The surveillance apparatus of claim 10, wherein the extending portions each define a second through hole, the handles each defining a fifth through hole corresponding to two fasteners and the second through holes, the first adjusting member and the third adjusting member assembled together by mounting the fasteners to the second through holes and the fifth through holes.

12. The surveillance apparatus of claim 10, wherein further comprising a plurality of screws, the third annular plate define four third through holes, the image pick-up module are engaged with the second adjusting member by mounting the screws into the third through holes.

13. The surveillance apparatus of claim 10, wherein the inner diameter of the fourth annular plate is substantially equal to the outer diameter of the third annular plate.

* * * * *